UNITED STATES PATENT OFFICE.

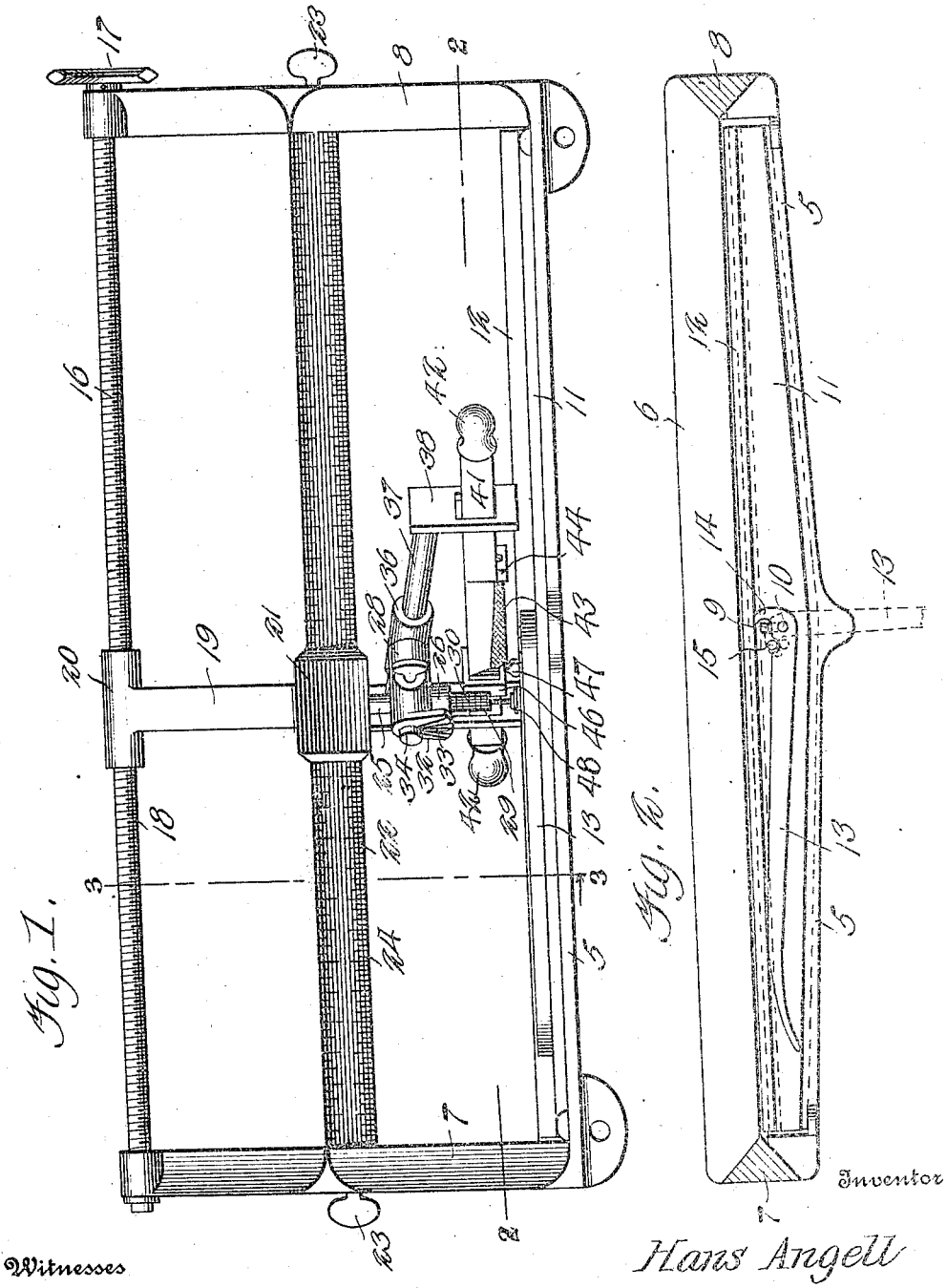

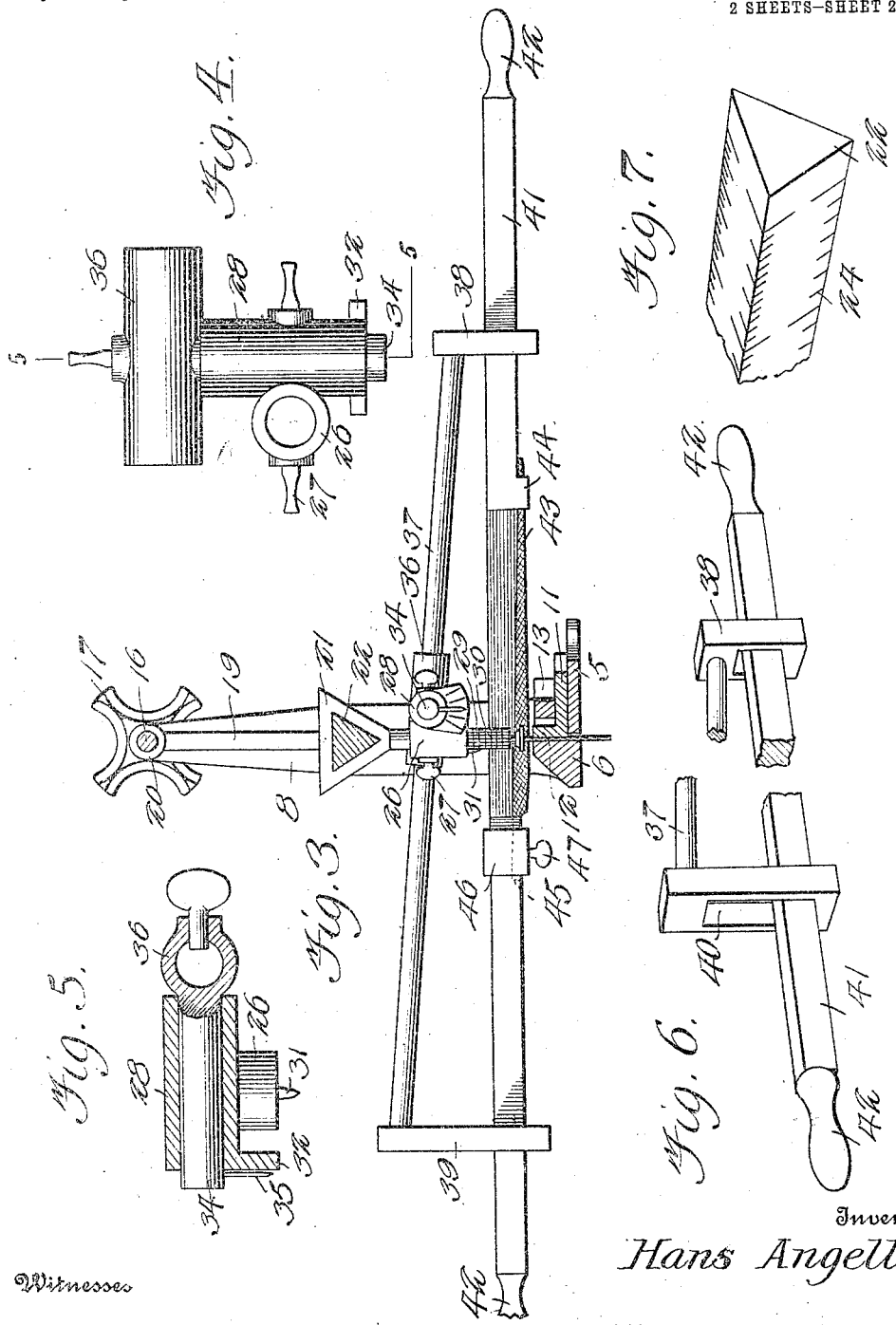

HANS ANGELL, OF MISSOULA, MONTANA.

SAW-FILING MACHINE.

1,024,387.

Specification of Letters Patent. Patented Apr. 23, 1912.

Application filed January 10, 1911. Serial No. 601,804.

*To all whom it may concern:*

Be it known that I, HANS ANGELL, a citizen of the United States, residing at Missoula, in the county of Missoula and State of Montana, have invented new and useful Improvements in Saw-Filing Machines, of which the following is a specification.

This invention relates to improvements in saw filing machines and has for one of its objects the provision of means in a device of this character which adjustably and pivotally holds a file and which is adapted to be adjusted to the bevel of the saw teeth and further adjusted so that the file carried thereby will penetrate only to a predetermined distance during the operation of filing.

Another object is the provision of a saw filing machine one side of which is provided with a longitudinal slot to receive the saw blade, a clamp coöperating with one side of the same to retain the saw blade therein and a member for actuating the clamp to move into and out of engagement with the saw blade.

Further objects of the invention will appear as the following specific description is read in connection with the accompanying drawing which forms a part of this specification, and in which:—

Figure 1 is a front elevation of the device with the file holder in perspective. Fig. 2 is a sectional plan view on the line 2—2 of Fig. 1 with the file holder removed. Fig. 3 is a sectional end view approximately on the line 3—3 of Fig. 1 looking in the direction of the arrow. Fig. 4 is a detail plan view of the device for connecting the file holder with the frame. Fig. 5 is a sectional end view on the line 5—5 of Fig. 4. Fig. 6 is a detail perspective of the opposite end portions of the guide for the file holder. Fig. 7 is a detail perspective of the guide bar.

Similar numerals of reference are employed to designate corresponding parts throughout.

The frame which is adapted to be secured to a stand (not shown) comprises what will subsequently be termed a lower side member made up of two sections designated by the numerals 5 and 6. The sections 5 and 6 are arranged parallel with each other and spaced apart for a sufficient distance to receive the blade of an ordinary crosscut or rip saw. The section 6 is somewhat greater in thickness than the section 5 and is positioned with its lower face in a plane with the lower face of the section 5 so that its upper surface will extend for a distance above the corresponding surface of the section 5 and that portion of its inner surface extending above the section 5 coöperating with a clamping member to be described later, to hold the saw blade against movement while being operated upon. End members are designated by the numerals 7 and 8, their lower end portions being recessed longitudinally and mortised to receive the opposite end portions of the sections 5 and 6 of the lower side member.

Extending vertically from the center of the upper surface of the section 5 of the lower side member is a block 9, the upper end of which has projecting therefrom a pin 10, upon which is mounted the body portion 11 of the clamping member approximately corresponding in length and width to the length and width of the section 5 and having on its inner side a flange 12 of equal length with the body and the upper surface of which is flush with the upper surface of the section 6. Formed in the center of the body 11 is a transverse oblong opening somewhat greater in length than the length of the block 9 and adapted to loosely receive the latter so as to slide thereover. An operating lever is designated by the numeral 13 and has one end portion thereof rounded and extended laterally so as to provide a cam hook 14. The rounded end portion of the operating lever is provided with an opening to receive the pin 10, and extending upwardly from the upper surface of the body 11 is a pin 15. The rounded end portion of the operating lever and the cam surface of the hook coöperate to move the clamping member inwardly or toward the member 6, when the operating lever is moved to a position parallel with the flange 12. When the operating lever, however, is moved outwardly the hook 14 engages with the pin 15, and as the operating lever is turned outwardly, an outward movement is imparted to the clamping member.

The upper end portions of the ends 7 and 8 are connected by a threaded rod 16. This rod has its opposite ends reduced and rotatably mounted in the upper end portions of the ends 7 and 8, and is provided with a hand wheel 17 whereby the same may be rotated. The rod forms one part of a feed mechanism or a device for moving the file into the spaces between the various teeth of the saw to be operated upon. The other portions of the feed mechanism will be described in the order of assembling the parts.

A hanger 19 is provided having a vertical portion upon which is formed an interiorly screw-threaded sleeve 20, to receive the threaded portion of the rod 16. The lower end portion of the hanger terminates in a slide 21 having an inverted triangular aperture which is adapted to receive a correspondingly shaped bar 22, the opposite ends of which are mounted in lateral sockets formed in the ends 7 and 8. The bar 22 is held against displacement by means of set screws 23 screwed into the ends 7 and 8 to bind on the opposite ends of the bar 22. The surfaces of the bar 22 are provided with a plurality of graduations or scale marks 24, the spaces between the markings on each of the surfaces being different in width to conform to the pitch of different saws and two of said bars are furnished with each machine one having an even number of graduations and the other having an odd number so that saws having an even or an odd number of teeth to the inch may be filed properly. Depending from the medial portion of the lower end of the slide 21 is a shaft 25.

The file holder and the means for connecting the same to the shaft 25 will now be described.

A vertical sleeve member is designated by the numeral 26 and is of a size to loosely receive the shaft 25. This sleeve member is provided with a lateral screw-threaded opening for the reception of a set-screw 27 to bind on the shaft 25. Formed on the exterior of the sleeve 26 diametrically opposite to the opening for the set-screw, and extending at the right axis of the sleeve is a sleeve 28. By reference now to the drawings it will be seen that the shaft 25 is provided with a plurality of spaced vertical lines 29, and further provided with a plurality of spaced horizontal lines 30 crossing the lines 29, and depending from the lower end of the sleeve 26 is a pointer 31 adapted to work over said graduations. Secured to the lower side portion of one end of the horizontal sleeve 28 is a sector-shaped plate 32 having on its outer surface a plurality of graduations 33 and the horizontally disposed sleeve 28 has a pin 34 mounted therein, one end of which extends through one end of the sleeve and is provided with a depending finger 35 overlying the graduated surface of the sector-shaped plate 32. The opposite end of the pin 34 is provided with a sleeve 36. The sleeve 28 has a set screw therein adapted to lock the pin 34 against rotation. The sleeve 36 loosely receives a rod 37, forming the body portion of a combined guide and stop for the file holder. One end of the rod 37 is provided with a block 38, while the opposite end is provided with a block 39 considerably greater in length than the block 38 and having an oblong opening 40, which alines with a smaller opening in the block 38. The openings in the blocks 38 and 39 receive the opposite end portions of the body 41 of a file holder, the opposite ends of the body being provided with handle grips 42. The opening in the smaller block 38 is of a size to nicely receive the body 41, while the oblong opening is considerably greater in length than the width of the block, as clearly shown in the drawings.

The file is designated by the numeral 43 and is positioned on the medial portion of the lower side of the body 41, one end of the file extending into a socketed block 44, and its opposite end being received by a recess 45.

Slidingly fitted on the body 41 of the file holder is a collar 46, which slides over the recess 45 and has formed in the side adjacent to the recess an opening to receive a set-screw 47, adapted to bind on the file when positioned in the recess to prevent endwise and lateral movement of the file.

In the operation of the device and assuming that a saw is positioned between the sections of the lower side in a manner before described and the vertical sleeve 26 is positioned on the shaft 25 the set-screw in the sleeve is moved from engagement with the shaft, thus permitting the file holder and its parts to descend so that the file will enter the space between two adjacent teeth of the saw. Assuming that the teeth are to be sharpened the file holder is turned until one face of the file bears on the beveled side of the teeth, after which the vertical sleeve is locked against movement by turning the set-screw 27 thereof into engagement with the shaft 25. It will be seen when the parts are so positioned the body portion of the file holder may be reciprocated in the ordinary manner and after the tooth has been filed the said body portion may be moved upwardly in the oblong opening in the block and the hand wheel turned until the file is in the position to enter the next succeeding space between the teeth. By reference now to the drawings it will be seen that a gage screw 48 is threaded into the lower end of the shaft 25. When the filing of the saw has proceeded far enough in either direction it is necessary to move the saw so that the filing may be completed to either end. The screw runs down on the teeth, the clamp screw loosened, and the saw moved so as to enable the operator to file all teeth clean to the end. The saw is then pushed up in the frame until the teeth engage the screw and clamping screw fastened. The filing may then be continued. When it is desired to increase the depth of the filing, the vertical sleeve is lowered on the shaft which carries with it the file carrier, as will be clearly understood. When the lower end of the oblong opening 40 moves below the lower side of the body 41 of the file carrier, (the file carrier resting upon the saw), the sleeve 26 is secured to the shaft in the manner before described and the file holder then reciprocated in the usual manner. The file will then cut into the saw blade until the lower side of the file holder bears on the lower end of the opening 40, whereby further downward movement of the file will be prevented.

From the foregoing, it is evident that I have provided a device which is comparatively simple in structure and inexpensive to manufacture, embodying few parts and these so arranged that the danger of derangement will be reduced to a minimum.

I claim:—

1. In a saw filing machine, the combination with a frame, of a hanger slidably mounted thereon including a shaft, a sleeve adjustably secured to the shaft, a second sleeve pivotally mounted upon the first sleeve, a bar slidably mounted in the second sleeve, depending arms secured to the ends of the bar and having slots therein of different lengths, and a file holder slidably mounted in said slots and having free vertical movement in one of them.

2. In a saw filing machine, a frame, means to clamp a saw within the frame, a feeding screw journaled in the frame, a supporting bar removably carried by the frame, a hanger slidably mounted upon said bar and connected to the feeding screw, a universally mounted file holder support carried by the hanger, and a file holder slidably mounted in the support and being adapted for vertical movement therein.

3. In a saw filing machine, a frame, means to clamp a saw within the frame, a feeding screw journaled in the frame, a supporting bar removably carried by the frame, a hanger slidably mounted upon said bar and connected to the feeding screw, a universally mounted file holder support carried by the hanger, and comprising in part depending arms having different sized slots therein, and a file holder slidably mounted in said slots and having vertical movement in one of them.

4. In a saw filing machine, a frame, means to clamp a saw within the frame, a feeding screw journaled in the frame, a supporting bar removably carried by the frame, a hanger slidably mounted upon said bar and connected to the feeding screw, a file holder support, means for adjusting said support to determine the angular horizontal relation of the file with the saw blade, means to adjust the support to determine the angular relation of the same with the saw blade, said support having slots of different lengths and a file holder slidably mounted in said slots and adapted for vertical movement in one of them.

In testimony whereof I affix my signature in presence of two witnesses.

HANS ANGELL.

Witnesses:
JOHN C. CARLEN,
LAURIZ JOHNSON.